June 6, 1967     ISAO INUZUKA ETAL     3,323,617
FULL-EMPTY DETECTING MEANS FOR A PARKING DEVICE
Filed April 2, 1964     2 Sheets-Sheet 1
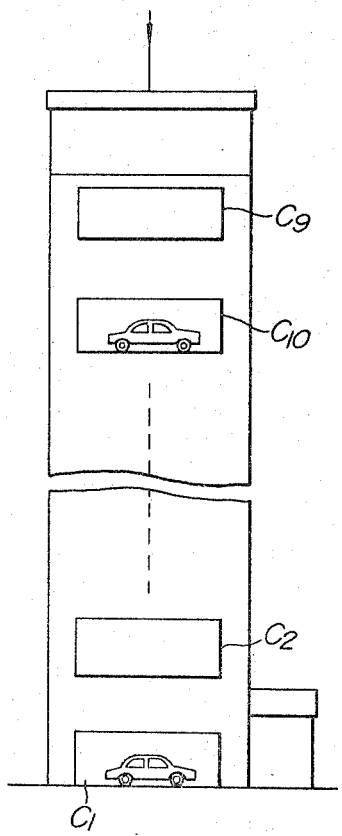
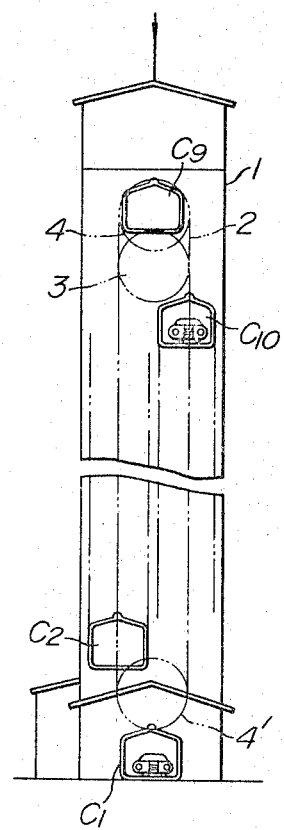
INVENTORS
Isao Inuzuka
Takeo Yuminaka
By Paul M. Craig Jr.
ATTORNEY

United States Patent Office 3,323,617
Patented June 6, 1967

3,323,617
FULL-EMPTY DETECTING MEANS FOR A PARKING DEVICE
Isao Inuzuka and Takeo Yuminaka, Katsuta-shi, Japan, assignors to Hitachi, Ltd., Tokyo, Japan, a corporation of Japan
Filed Apr. 2, 1964, Ser. No. 356,910
Claims priority, application Japan, Apr. 5, 1963, 38/17,199
5 Claims. (Cl. 187—16)

The present invention relates to parking equipment, and more particularly to a system for detecting full and empty parking cages which is especially suitable for a parking building in which parking spaces are disposed in vertically spaced relation for endless circulation, that is, a parking building of so-called merry-go-round type.

Generally, presence or absence of automotive vehicles in a plurality of parking cages in a parking building of the merry-go-round type has heretofore been indicated by a system in which means such as a plurality of snap switches or key switches, one for each parking cage, are provided and mechanically manipulated by a care-taker on his judgment, or by a system in which detecting means is provided for each parking cage. However, these systems have been defective in that, in the former system, the switches must be manipulated each time any one cage is filled or emptied, while a high installation cost is required in the latter system.

The present invention has for its object to eliminate the above drawbacks of the prior system and to provide parking equipment having single full-empty detecting means by which presence or absence of automotive vehicles in a plurality of parking cages can safely and accurately be detected in an automatic manner and signalled in a highly efficient manner.

The present invention is thus characterized in that presence or absence of automotive vehicles in a plurality of parking cages can always be ascertained by a single full-empty detecting means.

According to the invention, there is provided parking equipment comprising an outer structure, a plurality of parking cages arranged in vertically spaced apart relation in said outer structure, means for driving said parking cages for endless circulation, a predetermined position in said outer structure at which an automotive vehicle enters and leaves said parking cages, full-empty detecting means operative in response to stoppage of any one of said parking cages at said predetermined position for detecting presence or absence of an automotive vehicle in said parking cage, memory means for storing an output of said full-empty detecting means, and means for altering the content of said memory means when said full-empty detecting means acts again on the same parking cage.

There are other objects and particularities of the invention which will become obvious from the following description with reference to the accompanying drawings, in which:

FIG. 1 is a schematic side elevational view of parking equiment embodying the invention;

FIG. 2 is a schematic front elevational view of the parking equipment;

A preferred embodiment of the invention will now be explained with reference to the drawings. For convenience of explanation, it is assumed that the parking equipment of the invention includes sixteen parking cages therein and photoelectric means are employed as a most preferred form of full-empty detecting means.

Referring to FIGS. 1 and 2, there is shown an outer structure 1 of the parking building in which an endless chain 2 is vertically movably disposed. The endless chain 2 is driven by a main drive gear 3 and supported at opposite ends by follower sprocket wheels 4 and 4'. Parking cages $C_1$–$C_{16}$ are suspended in equally spaced apart relation from the endless chain 2. In FIGS. 1 and 2, it will be seen that only the parking cages $C_1$, $C_2$, $C_9$ and $C_{10}$ are shown in which $C_1$ and $C_{10}$ are filled, while $C_2$ and $C_9$ are empty.

Figure 3:
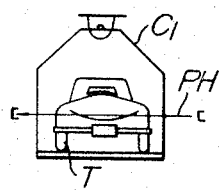
FIG. 3 is a front elevational view of a filled parking cage situated at an entrance and exit of the parking equipment, showing a relation between the parking cage and an arrangement of photoelectric means as one form of full-empty detecting means of the invention.
Figure 4:
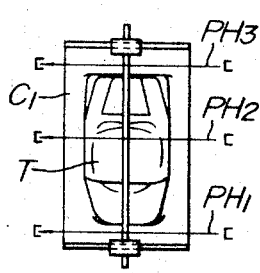
FIG. 4 is a plan view of FIG. 3.

In FIGS. 3 and 4, one of the parking cages $C_1$ is shown as carrying therein an automotive vehicle T and resting at the lowermost position shown in FIG. 2, that is, an entrance and exit of the parking building. However, it will be understood that the entrance and exit may be provided at any position in the parking building. Full-empty detecting means $PH_1$–$PH_3$ in the form of photoelectric means are disposed on opposite walls of the position at which the parking cage $C_1$ is at rest.

Figure 5:
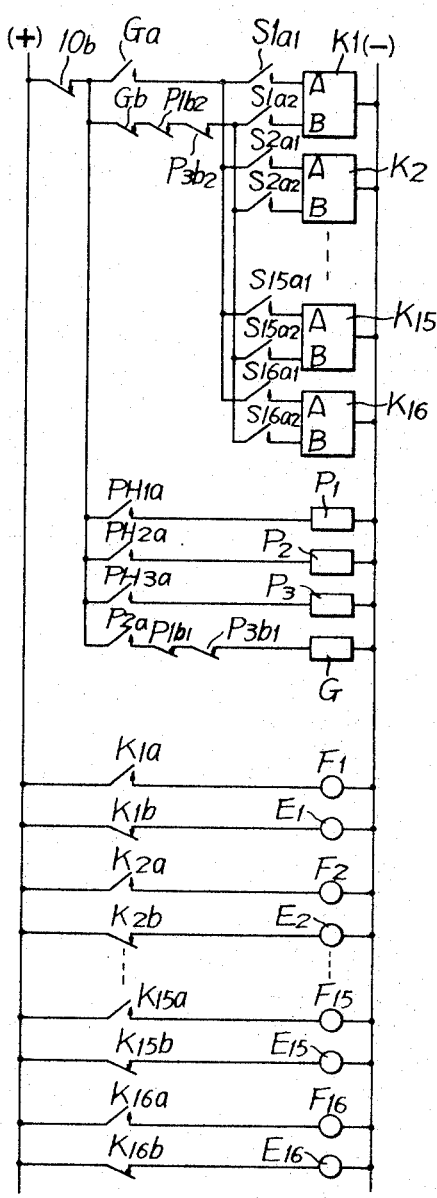
FIG. 5 is a circuit diagram of one form of a signal circuit of the invention.

FIG. 5 shows one form of a signal circuit adapted for the invention, which is energized by a power source indicated at (+) and (−). The signal circuit includes signaling relays $K_1$–$K_{16}$, which are actually so-called latching relays. The latching relay operates in a manner whereby it is energized when excited at the side A thereof, held in the energized state even when excitation at the side A ceases, and is deenergized only when excited at the side B thereof. Thus, the relays $K_1$–$K_{16}$ can be used as memory means. Symbols $K_{1a}$–$K_{16a}$ and $K_{1b}$–$K_{16b}$ denote auxiliary contacts of the latching relays $K_1$–$K_{16}$. Hereinafter, normally open or make contacts and normally closed or break contacts of the relays are suffixed with $a$ and $b$, respectively, to clearly distinguish the former from the latter.

Symbols $P_1$–$P_3$ indicate auxiliary relays of the respective photoelectric means $PH_1$–$PH_3$ and are connected to the power source in a manner that they are energized by respective contacts $PH_{1a}$–$PH_{3a}$ which are closed whenever beams of the photoelectric means $PH_1$–$PH_3$ are intercepted by the vehicle T. Symbols $F_1$–$F_{16}$ indicate full-cage indicating lamps for the respective parking cages $C_1$–$C_{16}$ and are arranged to be lit when the respective signalling relays $K_1$–$K_{16}$ are energized. Symbols $E_1$–$E_{16}$ indicate empty-cage indicating lamps for the respective parking cages $C_1$–$C_{16}$ and are arranged to be lit when the respective signalling relays $K_1$–$K_{16}$ are in their deenergized state. Symbols $S_1$–$S_{16}$ denote relays which are energized when the respective parking cages $C_1$–$C_{16}$ come to rest at the vehicle entrance and exit. For the sake of avoiding any confusion, driving coils of the relays $S_1$–$S_{16}$ are not illustrated.

A full-cage detecting relay G is provided in the circuit and connected to the signalling relays $K_1$–$K_{16}$ through contacts of the auxiliary relays $P_1$–$P_3$ for the photoelectric means so that it may be energized when an automotive vehicle T gets into any one parking cage resting at the vehicle entrance and exit and takes a normal position in the parking cage. A relay is provided which is energized when the parking cages $C_1$–$C_{16}$ are driven for endless circulation by the rotation of the endless chain 2 which is driven by the main drive gear 3 in FIG. 2. An auxiliary contact $10_b$ of this relay is closed only when the parking cages are not in operation.

Now, assume that all of the parking cages $C_1$–$C_{16}$ are empty. Since, in this case, the contacts $PH_{1a}$–$PH_{3a}$ of the photoelectric means $PH_1$–$PH_3$ are kept open, the full-cage detecting relay G continues to be denergized and all of the full-empty signalling relays $K_1$–$K_{16}$ are inoperative. Therefore, the empty-cage indicating lamps $E_1$–$E_{16}$ are lit by the closure of the respective contacts $K_{1b}$–$K_{16b}$ to indicate that all of the parking cages $C_1$–$C_{16}$ are now empty. Suppose that, under this condition, an automotive vehicle T gets into the parking cage $C_1$ which is at rest at the vehicle entrance and exit and takes the normal position in the cage as shown in FIGS. 3 and 4. Then, the beam of the photoelectric means $PH_2$ is solely intercepted and its contact $PH_{2a}$ is closed in FIG. 5. Therefore, the auxiliary relay $P_2$ is energized by a circuit of $$(+)-10_b-PH_{2a}-P_2-(-)$$

and its contact $P_{2a}$ is urged to the closed position. By the closure of the contact $P_{2a}$, the full-cage detecting relay G is energized by a circuit of $$(+)-10_b-P_{2a}-P_{1b1}-P_{3b1}-G-(-)$$

and its contact $G_a$ is urged to the closed position. Since the parking cage $C_1$ is at rest at the vehicle entrance and exit, the contact $S_{1a1}$ is closed and the full-empty signalling relay $K_1$ associated with the parking cage $C_1$ is energized by a circuit of $(+)-10_b-G_a-S_{1a1}-K_1-(-)$ to close its contact $K_{1a}$, resulting in the lighting of the full-cage indicating lamp $F_1$ associated with the parking cage $C_1$.

Explanation will next be made with regard to the operation of bringing the empty cage $C_2$ to the vehicle entrance and exit for parking another vehicle therein. As the parking cage $C_2$ is moved to the entrance and exit, all of the contacts $10_b$, $G_a$ and $S_{1a}$ are opened, but the latching relay $K_1$ as the memory means is kept in its energized state, and the full-cage indicating lamp $F_1$ associated with the cage $C_1$ remains lit. When the empty parking cage $C_2$ is finally brought to a halt at the vehicle entrance and exit, the contacts $10_b$, $S_{2a1}$ and $S_{2a2}$ are closed. Therefore, the latching relay $K_2$ is excited at its side B by a circuit of $$(+)-10_b-G_b-P_{1b2}-P_{3b2}-S_{2a2}-K_2 \text{ (side B)}-(-)$$

but would not be energized and the lamp $E_2$ is still indicating that the parking cage $C_2$ is empty. Now, an automotive vehicle gets into the parking cage $C_2$ and intercepts the beam of the photoelectric means $PH_1$. The auxiliary relay $P_1$ is energized by the closure of the contact $PH_{1a}$, but the full-cage detecting relay G is not energized. The full-cage detecting relay G is held from energization and the signal device remains intact as long as the beam from the photoelectric means $PH_1$ is intercepted, even when the beam from the photoelectric means $PH_2$ is intercepted to close its contact $PH_{2a}$ which thereby energize the auxiliary relay $P_2$ to close its contact $P_{2a}$.

Then, when the vehicle is further advanced into the cage to the point where it takes the position as shown in FIG. 4 at which the rear portion of the vehicle body no longer intercepts the beam from the photoelectric means $PH_1$, the contact $P_{1b1}$ is closed and the full-cage detecting relay G is energized by a circuit of $$(+)-10_b-P_{2a}-P_{1b1}-P_{3b1}-G-(-)$$

This full-cage detecting relay G acts as a transfer means for transferring the contents of memory stored in the latching relay $K_2$ working as the memory means. Or more precisely, by the closure of its contact $G_a$, the full-empty signalling relay $K_2$ associated with the parking cage $C_2$ is energized by a circuit of $$(+)-10_b-G_a-S_{2a1}-K_2 \text{ (side A)}-(-)$$

so that the full-cage indicating lamp $F_2$ is lit by a circuit of $(+)-K_{2a}-F_2-(-)$ and at the same time the empty-cage indicating lamp $E_2$ is deenergized. As described with regard to the former case, this condition is maintained even after the parking cage $C_2$ is moved upwardly away from the vehicle entrance and exit.

Then, consider a case wherein the parking cage $C_{15}$ (not shown) is full and an automotive vehicle therein is taken out. Since the cage $C_{15}$ is full, the latching relay $C_{15}$ is maintained in its energized state and the full-cage indicating lamp $F_{15}$ associated with the cage $C_{15}$ is lit by a circuit $(+)-K_{15a}-F_{15}-(-)$. When the endless chain 2 is rotated and the train of the parking cages starts to move, the contact $10_b$ is urged to the open position to cut off the signal control circuit from the power source. All of the latching relays $K_1$–$K_{16}$ remain in their respective states and the full-cage indicating lamp $F_{15}$ remains lit. When the parking cage $C_{15}$ is brought down to the vehicle entrance and exit and brought to a halt thereat, the contacts $10_b$, $S_{15a1}$ and $S_{15a2}$ are closed. The relay G is energized as soon as the parking cage $C_{15}$ carrying therein the vehicle comes to rest at the vehicle entrance and exit, as shown in FIG. 4. When, under this condition, the vehicle moves backward to get out of the parking cage $C_{15}$ and in its backward movement intercepts the beam from the photoelectric means $PH_1$ with its rear portion of the body, the contact $P_{1b1}$ is urged to the open position and the full-cage detecting relay G having been energized is now released, resulting in the opening of the contact $G_a$ and closure of the contact $G_b$. When the vehicle further moves backward and finally completely emerges from the parking cage $C_{15}$, the contact $P_{1b2}$ is closed and the latching relay $K_{15}$ is excited at the side B by a circuit of $$(+)-10_b-G_b-P_{1b2}-S_{15a2}-K_{15} \text{ (Side B)}-(-)$$

and is therefore deenergized. By the deenergization of the latching relay $K_{15}$, the contact $K_{15a}$ is now open and the contact $K_{15b}$ is closed. Therefore, the full-cage indicating lamp $F_{15}$ associated with the parking cage $C_{15}$ is deenergized and the empty-cage indicating lamp $E_{15}$ is now lit to indicate that the parking cage $C_{15}$ is now empty. It will be readily known that, by successive repetition of the above operations, it is possible to indicate at all times the full or empty state of the parking cages $C_1$–$C_{16}$.

What is claimed is:

1. Parking equipment comprising an outer structure, a plurality of parking cages arranged in vertically spaced relation in said outer structure, means for driving said parking cages for endless circulation, a predetermined position in said outer structure at which an automotive vehicle enters and leaves said parking cages, a single light responsive full-empty detecting means located at said predetermined position at the longitudinal sides of the cages for detecting the presence and absence of a vehicle in said cage, said detecting means including recording means to record the full-empty condition of said cages at said predetermined position and to maintain said recording during subsequent circulation of said cages, and control means responsive to the subsequent stoppage of a cage at said predetermined position to record a change in the full-empty condition of said cage.

2. The combination defined in claim 1, wherein said control means includes first and second detectors located at said predetermined position to detect the passage into and the presence of a vehicle in a cage at said predetermined position, said recording means being responsive to said second detector to determine the condition of a respective cage at said predetermined position, and first relay means responsive to said first detector for disabling control over said recording means by said second detector.

3. The combination defined in claim 2, wherein said recording means includes latching relays having first and second output contacts for each respective parking cage, and first and second indicator means connected to respective first and second output contacts of said latching relays for indicating the full-empty condition of each cage.

4. The combination defined in claim 3, wherein said control means further includes a full-cage detecting relay energized by said second detector and deenergized by said first detector, said full-cage detecting relay having a first energizing contact connected to an energizing winding of said first output contact of each latching relay and a second energizing contact connected to an energizing winding of said second output contact of each latching relay, said second energizing contact being enabled in the condition of rest of said full-cage detecting relay.

5. The combination defined in claim 4, wherein said control means further includes second relay means connected to the input of each latching relay for enabling energization of a respective latching relay only when the cage associated therewith is in said predetermined position.

References Cited

UNITED STATES PATENTS 1,940,867  12/1933  James et al. _____ 187—16
2,696,921  12/1954  Desjardin _____ 214—16.1

GERALD M. FORLENZA, *Primary Examiner.*

R. B. JOHNSON, *Assistant Examiner.*